United States Patent [19]

Jones

[11] 4,136,553
[45] Jan. 30, 1979

[54] METHOD FOR VERIFYING THE PRESSURE IN A NUCLEAR REACTOR FUEL ROD

[75] Inventor: William J. Jones, Pittsburgh, Pa.

[73] Assignee: Westinghouse Electric Corp., Pittsburgh, Pa.

[21] Appl. No.: 831,460

[22] Filed: Sep. 8, 1977

[51] Int. Cl.² ............................................. G01L 19/00
[52] U.S. Cl. ..................................... 73/52; 176/19 R
[58] Field of Search ....................... 176/19 LD, 19 R; 73/389, 23, 52

[56] References Cited
U.S. PATENT DOCUMENTS 3,246,522  4/1966  Rapson ................................... 73/389

Primary Examiner—Donald O. Woodiel
Attorney, Agent, or Firm—J. R. Campbell; Z. L. Dermer

[57] ABSTRACT

A method of accurately verifying the pressure contained in a sealed pressurized fuel rod by utilizing a pressure balance measurement technique wherein an end of the fuel rod extends through and is sealed in a wall of a small chamber. The chamber is pressurized to the nominal (desired) fuel rod pressure and the fuel rod is then pierced to interconnect the chamber and fuel rod. The deviation of chamber pressure is noted. The final combined pressure of the fuel rod and drill chamber is substantially equal to the nominal rod pressure; departure of the combined pressure from nominal is in direct proportion to departure of rod pressure from nominal. The maximum error in computing the rod pressure from the deviation of the combined pressure from nominal is estimated at plus or minus 3.0 psig. for rod pressures within the specified production limits. If the rod pressure is corrected for rod void volume using a digital printer data record, the accuracy improves to about plus or minus 2.0 psig.

4 Claims, 2 Drawing Figures

METHOD FOR VERIFYING THE PRESSURE IN A NUCLEAR REACTOR FUEL ROD

BACKGROUND OF THE INVENTION

The invention described herein relates to nuclear reactor fuel rods and more particularly to a method for verifying that the production specifications for internal pressure in fuel rods is being met and maintained.

The zircaloy, stainless steel or other fuel rods used in nuclear reactors are internally pressurized to about 500 psi. with a gas, such as helium, to facilitate the transfer of heat from fuel pellets in the rod to the zircaloy tubing or cladding where it is carried away by coolant circulated across the reactor fuel rods. Also, since the coolant circulates under a pressure of about 2200 psi. the internal pressure in fuel rods is used to help offset the external water pressure tending to collapse the fuel rod tubing.

Since production processes include pressurizing the rods, for quality control reasons, it is necessary to measure the pressure in representative samples of finished fuel rods to make certain that the production specifications for internal pressure is being met and maintained. It also is equally important that the test not destroy the fuel rod because of its relatively high monetary value.

The major problem encountered in measuring fuel rod internal pressure without rod destruction, is that a high degree of accuracy must be brought to the measurement process. Typical production specifications call for charging fuel rods to about 500 psi. and then maintaining a plus or minus 15 psi. tolerance from that pressure level. However, quality control engineers traditionally will seek an accuracy in the quality control test of an order of magnitude better, or in this example, plus or minus 1.5 psi. In a fuel rod charged to 500 psi. internal pressure, this 1.5 psi. value represents a measurement accuracy of plus or minus 0.3% of value. For this reason, attempts to make accurate non-invasive measurements have not been very successful. Therefore, one alternative is to pierce the wall of a rod, make an accurate pressure measurement and reweld the rod.

Although piercing the rod and discharging the gas therein into a chamber of known volume is possible, measuring the pressure to the required accuracy is still difficult because the rod void volume is known only to an accuracy of about plus or minus 20%. Decompression of the rod gas into a known volume therefore still requires subsequent precise measurements of the rod void volume. This can be done in a variety of ways, for example, refilling the rod to a known pressure, and without sealing the rod, decompressing the rod gas into a chamber of known volume to determine rod void volume; or, by utilizing a double decompression technique wherein the combined rod-chamber volume is subsequently decompressed into a second chamber of known volume. However, these techniques still will not provide the degree of accuracy necessary for determining on a sampling basis, whether fuel rods are consistently being charged to a gas pressure which meets production requirements.

SUMMARY OF THE INVENTION

A method for measuring fuel rod fill pressure preferably by laser piercing and subsequent rewelding of the fuel rod and by utilizing a pressure balance measuring technique wherein a small chamber is pre-pressurized to the nominal pressure contained in a fuel rod, piercing the fuel rod and interconnecting the chamber and the fuel rod to provide a final combined pressure. The deviation of the combined pressure from the nominal pressure in the fuel rod is in direct proportion to departure of fuel rod pressure from nominal.

BRIEF DESCRIPTION OF THE DRAWINGS

The subject matter of the invention is particularly pointed out and distinctly claimed in the concluding portion of this specification. The invention, however, both as to organization and method of operation may best be understood by reference to the following description taken in connection with the accompanying drawing, in which:

DESCRIPTION OF THE PREFERRED EMBODIMENT

Figure 1:
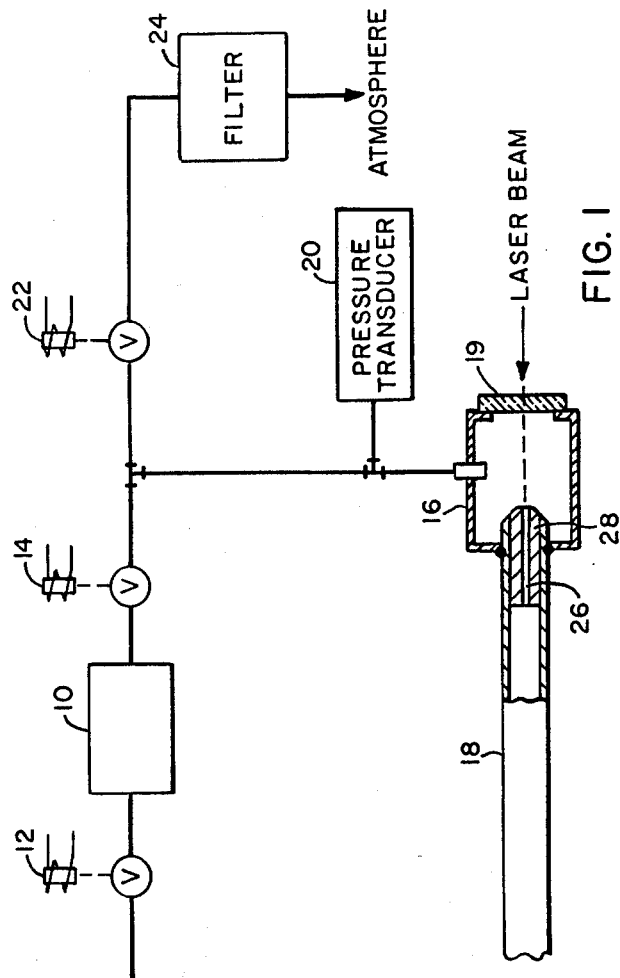
FIGS. 1 and 2 are a diagrammatic views of rod pressure measurement systems which includes components effective in carrying out the pressure balance measurement process.

Referring to the drawing, there is shown a system for measuring the pressure in a fuel rod by a null-balance measuring technique. Because laser drilling becomes significantly less effective at elevated pressure, the method disclosed herein permits rod drilling to be performed at ambient pressure, but retains the accuracy of the null-balance technique. A source of helium is connected to a ballast chamber 10 having a solenoid operated charge valve 12 and join valve 14. The join valve controls the discharge of gas from ballast chamber 10 to a drill chamber 16. A fuel rod 18 whose internal pressure is to be determined for quality control purposes, includes fuel pellets and is charged with a gas to a pressure of about 500 psi. in a manner well known in the art. The fuel rod is connected to discharge into the drill chamber 16 when the end of the rod is pierced by a laser beam adjusted for projection through window 19 in the drill chamber. Pressure transducer 20 detects system pressure and a solenoid operated vent valve 22 controls the discharge of ballast chamber 10, or drill chamber 16, through filter 24 to the atmosphere.

During the time of fuel rod manufacture, the rod is charged to a nominal or desired pressure of about 500 psi. usually through an axial opening 26 in an end plug 28 welded in an end of the fuel rod. The plug axial opening thereafter is welded shut thus sealing the gas in the fuel rod. Since it is necessary for quality control purposes to determine whether fuel rods being manufactured are consistently being charged with a gas and properly welded to retain the gas therein, representative samples of fuel rods are chosen for testing. The end of a chosen rod is then placed in drill chamber 16 as shown and described above.

The nominal pressure in the fuel rod is measured accurately by a null-balance technique. In the system arrangement shown, the nominal or desired pressure in the fuel rod is reasonably known in advance, assuming that it was properly charged and sealed initially. In making the measurement, the solenoid charge and join valves 12 and 14 are opened with vent valve 22 closed, thus permitting ballast and drill chambers 10 and 16 to be slowly charged with helium to a pressure $P_B$ which is determined to be 1.6 times the nominal rod pressure set on a digital potentiometer, not shown. When the predetermined ballast pressure is reached as determined by pressure transducer 20, charge valve 12 is deenergized and closed thus isolating the system from the helium supply source and establishing equal pressures in both the ballast and drill chambers. Then join valve 14 is closed and vent valve 22 opened to vent the drill chamber to the atmosphere. Vent valve is then reclosed, thus isolating the ballast chamber 10. The purpose for this step is to verify that the pressure $P_O$ from their combined volumes is equal to the nominal rod pressure. If necessary, the ballast pressure is adjusted and this step repeated until this condition of equality is met.

Prior to piercing the fuel rod end plug and decompressing the rod into the empty drill chamber, the ballast chamber, which is an auxiliary chamber, is filled with a pressure higher than nominal, i.e., 1.6 times nominal pressure in the fuel rod. The ballast pressure is selected such that when it is discharged into the drill chamber, it will produce a combined pressure in the two chambers equal to nominal rod pressure. As indicated above, the drill chamber is then vented to the atmosphere and the vent valve reclosed. After piercing the rod and allowing it to decompress into the drill chamber, the join valve is opened thus allowing the ballast chamber pressure to discharge into the drill chamber, thus recompressing gas in the drill chamber to a pressure near nominal. The final pressure in the three interconnected volumes is exactly that which would have resulted had a simple pressure balance measurement been implemented with a chamber equal in volume to the combined volume of the drill and ballast chambers. By recording the intermediate pressure in the rod drill chambers, it is also possible to calculate the rod void volume if desired.

A particular advantage gained from utilizing a drill chamber at atmospheric pressure at the time of piercing the fuel rod is that only a very small energy level is needed for fuel rod piercing because a high pressure level is not present which otherwise causes distortion of the laser beam.

Figure 2:
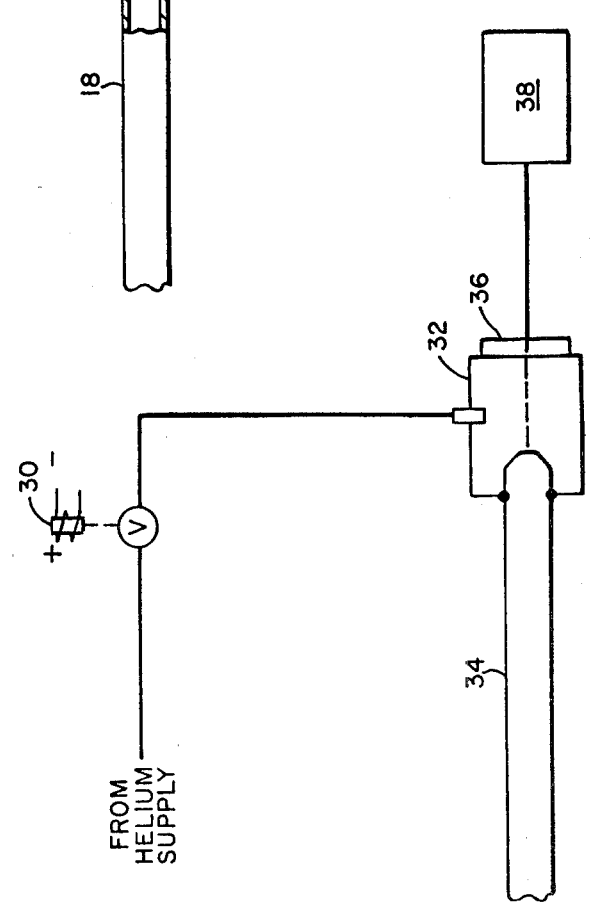

The null-balance measurement can also be used in a more simplified kind of arrangement of the type shown in FIG. 2 which includes a source of helium supply and a solenoid operated valve 30 connected to a drill chamber 32. The drill chamber includes a rod 34 projecting into one end thereof and in a position directly opposite from a window 36 and laser apparatus 38 which is used for drilling an opening in an end of the end plug as previously described. Since the nominal rod pressure is known in advance, the drill chamber 32 can be precharged to the nominal rod pressure prior to piercing the rod. Upon piercing the rod, the rod pressure is then merged with the pressure in the drill chamber and the deviation of the thus combined pressure $P_f$ from nominal is then directly related to the deviation of the rod pressure from nominal:

$$P_R - P_{NOM} = (1 + \frac{V_c}{V_R})(P_f - P_{NOM})$$

where:
$P_R$ = pressure in the rod
$P_{NOM}$ = nominal (desired rod pressure)
$V_c$ = chamber volume + rod void volume
$V_R$ = rod void volume
$P_f$ = chamber pressure + rod pressure For a suitably small ratio of chamber volume to rod void volume, the final $P_f$ will be substantially equal to rod pressure and unaffected by variations in rod void volume. However, even if the chamber volume is not insignificantly small, the rod pressure can still be accurately predicted from the combined pressure, its deviation from nominal being scaled up by the ratio $(1 + V_c/V_R)$. Moreover, the error in the pressure measurement due to inaccurate knowledge of $V_R$ is reduced significantly. The error in the measured value of $P_R$ due to variation in $V_R$ is given by the expression:

$$\Delta P_R = (\frac{\Delta V_R}{V_R})(\frac{V_c}{V_R})(P_f - P_{NOM})$$

For example, for a $V_c/V_R$ ratio of 1.0, the maximum deviation of P from $P_{NOM}$ for a rod whose pressure is within the $\pm$ 15 psig. spec is $\pm$ 7.5 psig. Thus:

$$\Delta P_R = \frac{\Delta V_R}{V_R}(1)(7.5) = 7.5\frac{(\Delta V_R)}{V_R}$$

Thus for a maximum variation of $V_R$ of $\pm$ 20% from nominal, the variation (error) in the measured value of $P_R$ will be $(0.20)(7.5) = 1.5$ psig.

Even this small error can be eliminated by a subsequent decompression of the combined volume into another volume to measure $V_R$.

To achieve maximum accuracy using the pressure balance technique the deviation of the balance pressure from the unknown must be minimized. For this reason it is most appropriate to quality control measurements to confirm a given pressure level which is known ahead of time, rather than measurements where no prior knowledge exists. The accuracy of the measurement degrades for pressures out of specification, but this is relatively unimportant because the test would not be continued with fuel rods which are substantially under pressure.

It will be apparent many modifications and variations are possible in light of the above teachings. It therefore should be understood that within the scope of the appended claims, the invention may be practiced other than as specifically described.

I claim:

1. The method of verifying gas pressure in a nuclear reactor fuel rod comprising the steps of:
   placing an end of a sealed fuel rod charged with a gas to a predetermined nominal pressure in a drill chamber;
   placing said drill chamber under atmospheric pressure;
   charging a ballast chamber connected with said drill chamber to a pressure greater than the nominal pressure,
   piercing the end of said rod to permit the gas therein to flow into said drill chamber;
   discharging the gas pressure from said ballast chamber into said drill chamber; and
   comparing the deviation of the combined pressure then in the drill chamber from nominal to determine the degree of charge in said fuel rod.

2. The method according to claim 1 including the step of selecting the ratio of the drill chamber volume to fuel rod void volume as small as practical in order to have the final combined ballast and fuel chamber pressure and fuel rod pressure, $P_f$, to be substantially equal to rod nominal pressure and unaffected by variations in rod void volume.

3. The method according to claim 1 wherein the ratio of chamber volume to rod void volume is chosen to be about 1; and scaling up the deviation of actual fuel rod pressure from fuel rod nominal pressure by the ratio (1 + $V_c/V_R$) for accurately predicting the rod pressure.

4. The method according to claim 1 including the step of charging said ballast chamber to a pressure greater than nominal pressure;

discharging the ballast pressure into the drill chamber, and then venting the drill chamber to provide atmospheric pressure therein recharging said ballast chamber, if necessary, to provide a pressure therein of about 1.6 times nominal pressure in the fuel rod prior to piercing the fuel rod and discharging its pressure into the drill chamber.

* * * * *